UNITED STATES PATENT OFFICE.

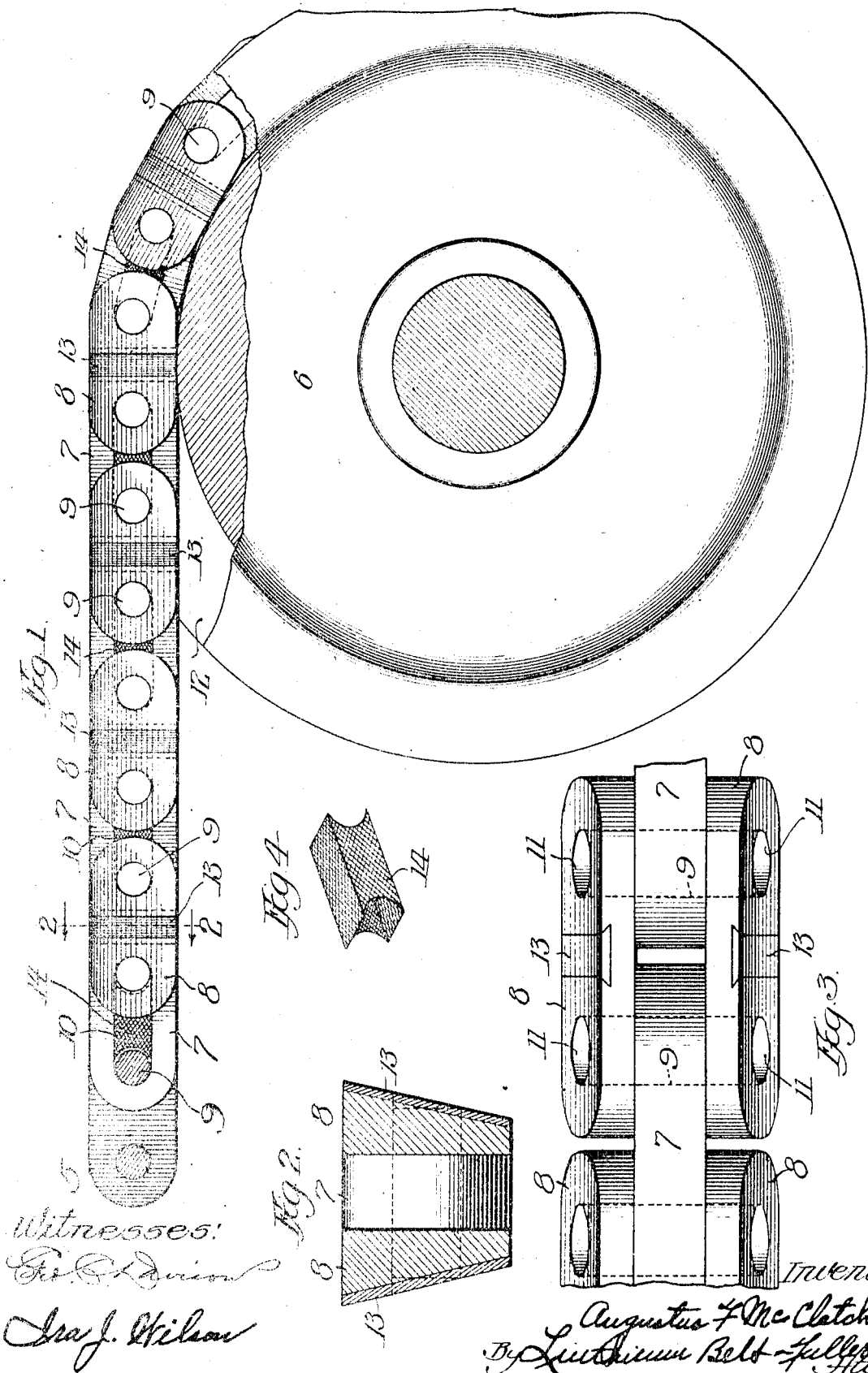

AUGUSTUS F. McCLATCHEY, OF AURORA, ILLINOIS; ASSIGNOR OF ONE-HALF TO JAMES E. CAGNEY, OF CHICAGO, ILLINOIS.

METALLIC POWER-BELT.

1,096,851.  Specification of Letters Patent.  Patented May 19, 1914.

Application filed October 12, 1911. Serial No. 654,320.

*To all whom it may concern:*

Be it known that I, AUGUSTUS F. MC-CLATCHEY, a citizen of the United States, residing at Aurora, in the county of Kane and State of Illinois, have invented certain new and useful Improvements in Metallic Power-Belts, of which the following is a specification.

This invention relates in general to power belts adapted for transmitting power from one pulley to another and aims to provide a belt of this general type which will be strong and durable but flexible to permit it to cling to pulleys of small diameter and at the same time inelastic so that it will not stretch and become loose on the pulleys when being used and in general to improve the construction, increase the efficiency and enhance the durability of metallic or chain belts.

Chain belts or V-shaped power belts of such shape as to fit in the grooves of grooved pulleys have their frictional contact with the pulleys, as is well known, at the sides of the grooves. In order to insure sufficient strength of the belt, the side bars which contact with the sides of the grooves must necessarily be made of strong relatively hard metal and if the friction between the hard metal side bars and the sides of the pulley grooves is alone relied upon for the power transmission, there will be considerable slippage of the belt by reason of the hard smooth character of the contacting parts. One of the objects of my present invention is to increase the efficiency of the belt by providing the side bars with inserts of relatively soft metal or other suitable material, which will afford a suitable and satisfactory frictional engagement with the pulleys thereby preventing slippage of the belt and also deadening the noise in running.

Another object of the present invention is to provide a self-lubricating belt which will continually lubricate the parts of the belt which move against or across each other without distributing the lubricant over the outside of the belt where it would tend to decrease its gripping power and facilitate slipping.

Still another object is the provision of a belt which is so constructed that all the moving parts will have sufficient looseness and play to prevent binding or cramping of the parts thereby decreasing the wear and correspondingly increasing the life of the belt.

Other objects and many of the advantages of the present invention will be understood from the following description when taken in connection with the accompanying drawings illustrating one preferred embodiment thereof.

Referring to the drawings: Figure 1 is a side elevation of a section of a belt embodied in my invention, showing its relation to the pulley around which it travels; Fig. 2 is a transverse sectional elevation taken on the line 2—2 of Fig. 1; Fig. 3 is a fragmentary view looking at the bottom of the belt shown in Fig. 1, and Fig. 4 is a perspective view of one of the lubricating cartridges employed.

On the drawings 5 designates generally a power belt embodying my invention and 6 designates a power-pulley around which the belt is adapted to travel. The belt is made up of alternately arranged links 7 and side bars 8, said links and side bars being connected together by connecting pins 9. The links 7 are preferably formed of case hardened wrought iron and each is provided with an elongated longitudinally extending slot 10 of slightly greater width than the diameter of the pins 9 so that the pins fit loosely therein and are permitted considerable freedom of movement without cramping or binding in the slots. The connecting pins 9 may have an enlarged annular shoulder which works in the slots of the links if preferred, but in the present instance I have shown the pins as of uniform diameter throughout their length. The side bars 8 are preferably formed of soft machine steel provided with recesses or openings 11 adjacent the ends thereof to receive the ends of the pins 9. The outer face of each of the side bars is beveled or inclined transversely of the bar from top to bottom of the belt, as indicated in Fig. 2, the inclination corresponding to the inclination of the inner faces 12 of the pulley grooves so that the maximum friction may be procured between the belt and the pulley.

The side bars are arranged in pairs with their beveled faces outwardly and each pair is rigidly connected together by means of the pins 9 which are preferably formed from case hardened wrought iron. The ends of the pins are forced or driven into the recesses or openings 11 of the side bars so as to fit tightly therein and securely and rigidly connect the side bars together. The pins are inserted preferably by compression which will contract the openings 11 around the pins and fixedly and permanently unite the ends of the pins with the side bars. In order that the outer faces of the side bars may present smooth surfaces which will not injure the pulley grooves, the pins are made of such a length that they do not project beyond the outer faces of the side bars thereby obviating the objectionable projections which are presented on chain belts wherein the pins are either riveted or keyed to the side bars. Slots 10 in the links permit the pins to move relatively toward and from each other and by reason of the fact that the slots are slightly wider than the diameter of the pins, so that the loose fit is obtained between the pins and the slots, a minimum surface contact between the pins and the links is obtained and a bearing is afforded which reduces the friction and wear between the parts to a minimum while at the same time permitting maximum freedom of movement and flexibility of the chain.

The side bars themselves are necessarily made of relatively hard material which would not in itself produce sufficient frictional engagement with the grooves of the power pulleys and for the purpose of increasing the frictional engagement to prevent slippage of the belt and also to deaden the noise of the belt when running, I have provided each of the side bars with an insert 13 of relatively soft metal or other suitable material. From the fact that the belt is made up of a series of side bars placed end to end and flexibly connected together, it will be manifest that the theoretical line of frictional contact between each link and the power pulley will lie in a plane extending radially of the pulley through each side bar mid-way its ends. Since the greatest if not the entire frictional engagement between each link and the power pulley is confined to the theoretical line of frictional contact, the maximum frictional engagement can be obtained by increasing the frictional properties of the side bars along this line and it has been found that as great friction can be obtained by employing a relatively narrow metallic insert located mid-way the ends of the link as could be obtained were the entire outer face of the link made of or covered with this frictional material. I have, therefore, in the present instance provided each of the links on its outer face, mid-way its ends, with a metal insert of relatively soft material having great frictional properties, which insert may be dove-tailed into the face of the link as shown. Other ways of securing the insert in position will suggest themselves to those familiar with the art and it will be understood therefore that I do not wish to be restricted to any particular method or manner of securing the insert in position.

To secure a smooth running of the belt and to decrease the wear between the links of the connecting pins, it is desirable that a lubricant be applied to the belt at this point but in view of the close fit between the side pieces and the links, it is very difficult to apply a lubricant from outside the belt to the pins within the links without distributing some of the lubricant over the outer faces of the side bars which, of course, would reduce the friction between the belt and the pulley and thereby impair the efficiency of the belt. In order to thoroughly lubricate the pins 11 inside the links without distributing any of the lubricant over the outer faces of the belt, I employ a series of lubricating cartridges 14 one of which is positioned, when the belt is being assembled, in each of the link slots 10 between the pins 9. This cartridge may be composed of graphite or any other suitable lubricant of relatively hard consistency and if preferred the lubricant may be surrounded by a light wire mesh which will aid in maintaining the cartridges in shape and will prevent the pieces of lubricant from dropping out or becoming loose in case the lubricant should be accidentally fractured or broken. One of these cartridges, as has been previously stated, is positioned in the slot of each link when the belt is being assembled and the belt therefore requires no further lubricant during its running. The pins 9 work back and forth in the link slots and the rocking movement of the pins in the links, as the belt travels around the pulleys, carries the lubricant around the pins to the point of wear where it is needed.

While I have shown and described in detail that embodiment of my invention which at present seems to be preferred, it will be understood that various changes in the construction and the size, shape and proportion of the various parts constituting the belt may be resorted to without departing from the spirit of the invention or sacrificing any of the material advantages thereof.

I claim:

1. A power belt comprising a chain composed of alternately arranged side bars and links, and pins rigidly connecting said side bars together and pivotally engaging said links, said side bars being provided with inserts extending transversely across their outer faces intermediate said pins.

2. A power belt comprising alternately arranged links and side bars, each of said side bars having a relatively narrow insert of soft material disposed transversely across its outer face.

3. A power belt consisting of a series of links having elongated slots, side bars disposed on each side of said series of links, pins of less diameter than the depth of the slots passing through the slots and rigidly connected at their outer ends with the side bars to rigidly connect the said side bars together in pairs, the outer faces of said side bars being provided with relatively narrow inserts of soft material disposed transversely thereacross, and lubricating cartridges disposed within the said slots between the pins.

4. A power belt comprising alternately arranged links and side bars, each of said side bars being provided with a transversely disposed relatively soft insert in its outer face dovetailed into the face of the bar.

5. A power belt comprising alternately arranged links and side bars, and pins connecting said links and side bars, the said side bars being provided with elongated inserts upon their outer faces, disposed centrally of the side bars at right angles to their longitudinal axes.

6. A power belt comprising a series of links provided with elongated slots, side bars disposed on each side of said links, and pins of less diameter than the width of the slots passing through said slots and rigidly connected at their outer ends with the side bars to rigidly connect the side bars together in pairs, the outer faces of said side bars being provided with relatively narrow inserts of soft material disposed transversely thereacross.

AUGUSTUS F. McCLATCHEY.

Witnesses:
   IRA J. WILSON,
   M. A. KIDDIE.